United States Patent [19]

Yoshida

[11] Patent Number: 5,594,867
[45] Date of Patent: Jan. 14, 1997

[54] DATA COMMUNICATION APPARATUS WHICH TRANSMITS IN ACCORDANCE WITH A RECEPTION TIME ZONE OR A TERMINAL FROM WHICH DATA HAS BEEN RECEIVED

[75] Inventor: Takehiro Yoshida, Tokyo, Japan

[73] Assignee: Canon Kabushiki Kaisha, Tokyo, Japan

[21] Appl. No.: 190,681

[22] Filed: Jan. 21, 1994

Related U.S. Application Data

[63] Continuation of Ser. No. 547,127, Jul. 3, 1990, abandoned.

[30] Foreign Application Priority Data

Jul. 4, 1989 [JP] Japan .................... 1-171128

[51] Int. Cl.$^6$ ................................ G06F 12/00
[52] U.S. Cl. ................ 395/200.15; 395/200.01; 358/407; 364/919.1; 364/270.4; 364/DIG. 2
[58] Field of Search .................... 395/800, 600, 395/200, 840, 200.01, 200.15; 358/402, 440, 405, 407, 437–438, 460; 379/67, 455; 340/825.44, 825.52; 370/94.1; 364/DIG. 1, DIG. 2

[56] References Cited

U.S. PATENT DOCUMENTS

| | | | |
|---|---|---|---|
| 3,920,895 | 11/1975 | Vieri et al. | 358/426 |
| 4,586,086 | 4/1986 | Ohzeki | 358/405 |
| 4,635,189 | 1/1987 | Kendall | 395/600 |
| 4,646,160 | 2/1987 | Iizuka et al. | 359/257 |
| 4,754,335 | 7/1988 | Izawa et al. | 358/256 |
| 4,760,572 | 7/1988 | Tomikawa | 370/94.1 |
| 4,872,005 | 10/1989 | DeLuca et al. | 340/825.44 |
| 4,922,348 | 5/1990 | Gillon et al. | 358/407 |
| 5,016,115 | 5/1991 | Calkins | 358/442 |
| 5,050,005 | 9/1991 | Kagami | 358/434 |
| 5,057,941 | 10/1991 | Moriya | 358/440 |
| 5,063,494 | 11/1991 | Davidowski et al. | 395/800 |
| 5,109,413 | 4/1992 | Comerford et al. | 380/4 |
| 5,113,495 | 5/1992 | Uehara | 395/200.16 |
| 5,134,615 | 7/1992 | Freeburg et al. | 370/95.3 |
| 5,168,376 | 12/1992 | Motohama | 358/437 |
| 5,175,760 | 12/1992 | Ohashi et al. | 379/67 |
| 5,189,693 | 2/1993 | Yoshida | 379/355 |
| 5,196,843 | 3/1993 | Yoshino | 340/825.52 |
| 5,216,461 | 6/1993 | Maekawa et al. | 355/202 |
| 5,237,428 | 8/1993 | Tajitsu et al. | 358/440 |
| 5,313,521 | 5/1994 | Torii et al. | 380/21 |
| 5,392,131 | 2/1995 | Umeno | 358/403 |
| 5,440,633 | 8/1995 | Augustine et al. | 380/23 |

*Primary Examiner*—Meng-Ai T. An
*Attorney, Agent, or Firm*—Fitzpatrick, Cella, Harper & Scinto

[57] ABSTRACT

A data communication apparatus performs relay multi-address communication of received data with another predetermined data communication apparatus designated in advance. The apparatus includes a determining unit for determining whether a current communication or a communication to be executed satisfies a predetermined condition, and a control unit for performing relay multi-address communication of the received data to another data communication apparatus designated in advance independent of any action at the transmitting end. In three advantageous embodiments, the apparatus can set a time zone for data transmission, transmit data to a plurality of destination stations and set a transmission mode. The apparatus determines whether data will be relayed based upon the time zone in which the data was received or upon the identity of the source terminal.

24 Claims, 5 Drawing Sheets

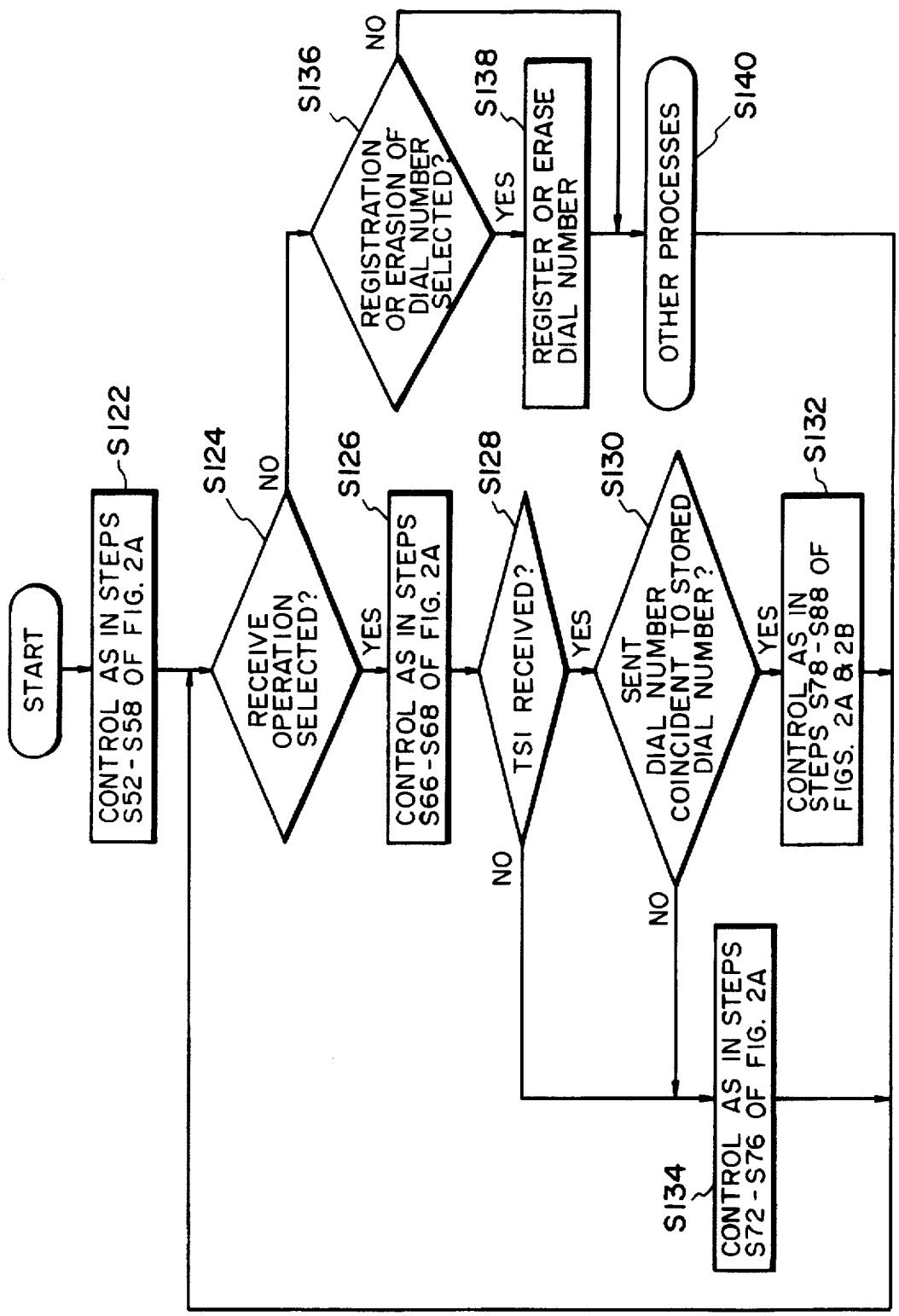

DATA COMMUNICATION APPARATUS WHICH TRANSMITS IN ACCORDANCE WITH A RECEPTION TIME ZONE OR A TERMINAL FROM WHICH DATA HAS BEEN RECEIVED

This application is a continuation of application Ser. No. 07/547,127 filed Jul. 3, 1990, now abandoned.

BACKGROUND OF THE INVENTION

1. Field of the Invention

The present invention relates to a data communication apparatus and, more particularly, to a data communication apparatus for transmitting "receive" data to another data communication apparatus designated beforehand.

2. Related Background Art

A facsimile apparatus for performing multi-address transmission (so-called relay multi-address) of receive image data to a designated destination (i.e, a called station) is known as a conventional apparatus of this type.

If there are many destinations to which an original is to be sent, an original image is temporarily stored in a memory and is automatically transmitted to the destinations in a given order. This facsimile transmission is called multi-address transmission. In addition, an operation for transmitting image data received in a memory to a plurality of stations is Galled relay multi-address transmission.

A facsimile apparatus capable of performing relay multi-address communication signals this function by using a signal (NSF signal in G3 protocol) representing a nonstandard apparatus to an image transmitting end.

When an operation for designating relay multi-address communication is required for a user at a transmitter, it detects in accordance with the above signal that a receiver has a relay multi-address communication function. Upon detection of this function, the transmitter designates relay multi-address communication by using a nonstandard apparatus setting signal (i.e., an NSS signal) and then transmits the image subjected to relay multi-address communication. Therefore, the receiver can sequentially transmit the image data to all called stations in accordance with a relay multi-address communication scheme.

Since the presence/absence of the relay multi-address communication function is detected and the relay multi-address communication is designated in a conventional system in accordance with the nonstandard function signals such as NSF, NSS, and NSC signals, relay multi-address communication can be performed between only facsimile apparatuses manufactured by the same manufacturer and cannot be performed between facsimile apparatuses manufactured by different manufacturers. In addition, relay multi-address communication can be designated from only the transmitter side. It is impossible to perform processing such as automatic transfer of image data at the receiver side.

Relay multi-address communication is disclosed in U.S. Pat. No. 4,785,355, but this proposal cannot solve the conventional problems described above.

SUMMARY OF THE INVENTION

It is an object of the present invention to improve a data communication apparatus in consideration of the conventional problems described above.

It is another object of the present invention to provide a data communication apparatus for transmitting receive data without using any special communication procedures or protocol.

It is still another object of the present invention to provide a data communication apparatus which can perform relay multi-address communication without a nonstandard procedure signal.

It is still another object of the present invention to provide a data communication apparatus for performing data relay multi-address transmission without any special relay command when a given condition coincides with a preset condition of an apparatus for performing data relay.

It is still another object of the present invention to provide a data communication apparatus for automatically transmitting receive data to another data communication apparatus when the data communication apparatus receives data from a predetermined station or source.

It is still another object of the present invention to provide a data communication apparatus for automatically transmitting receive data to another data communication apparatus when an incoming call is detected from a predetermined station within a predetermined period of time.

The above and other objects, features, and advantages of the present invention will be apparent from the detailed description of the preferred embodiments in conjunction with the accompanying drawings.

BRIEF DESCRIPTION OF THE DRAWINGS

FIGS. 3 and 4 are flow charts showing relay multi-address communication control of the facsimile apparatus according to the second and third methods of the present invention, respectively.

DETAILED DESCRIPTION OF THE PREFERRED EMBODIMENTS

An embodiment of the present invention will be described in detail with reference to the accompanying drawings.

Although this embodiment exemplifies a facsimile apparatus as the data communication apparatus, the present invention is not limited to a facsimile apparatus. The present invention is also applicable to data communication apparatuses (e.g., a teletex and computer communication) which perform the transfer of receive data and multi-address communication.

Figure 1:
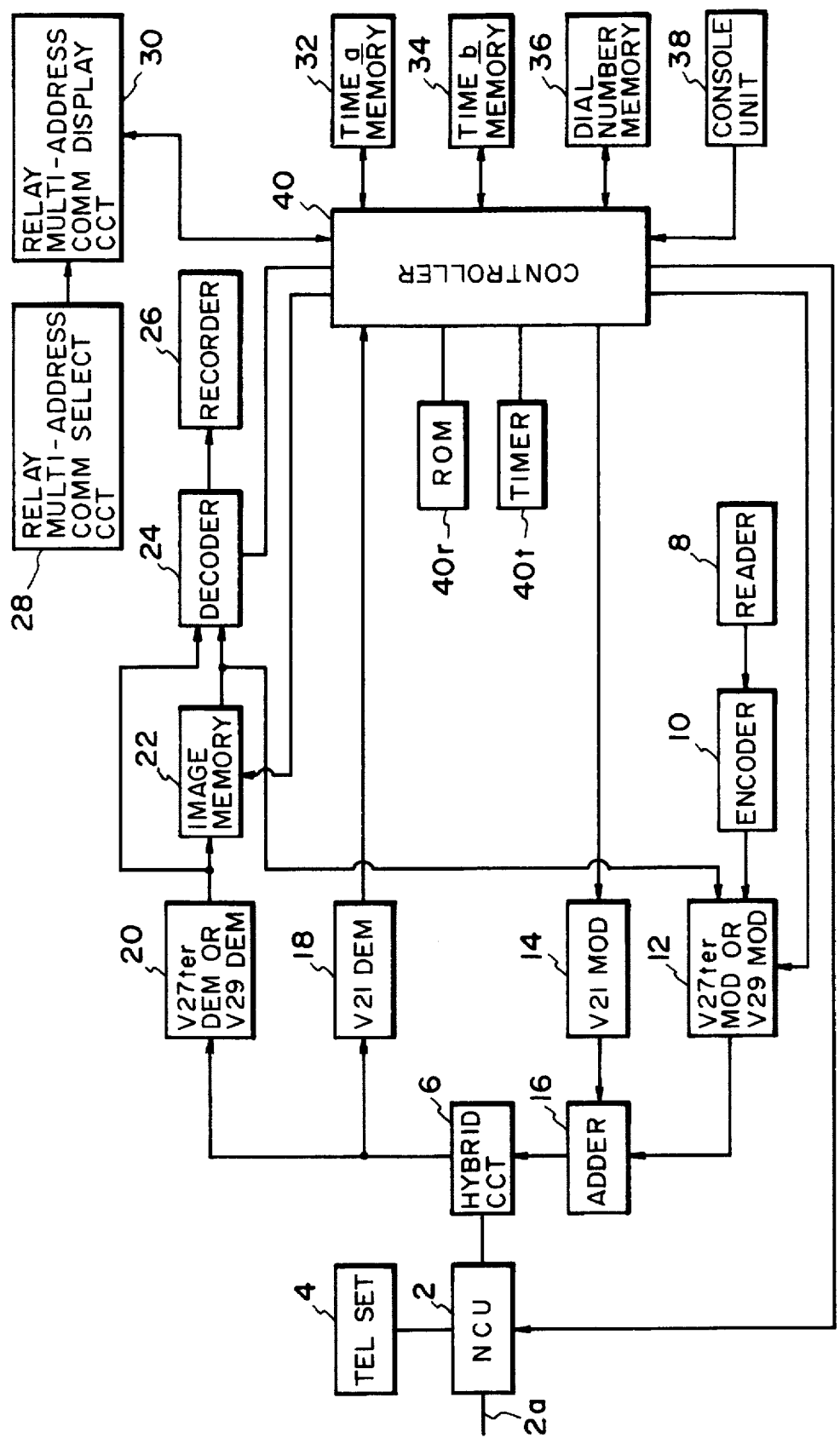
FIG. 1 is a block diagram of a facsimile apparatus according to an embodiment of the present invention.

FIG. 1 is a block diagram showing an arrangement of the facsimile apparatus of this embodiment.

An NCU (Network Control Unit) 2 is connected to a terminal of a telephone network to control engagement of a telephone network and to maintain a loop so as to perform data communication or the like. If a signal level from a controller 40 is set at level "0", the NCU 2 connects a line 2a to a telephone set 4. If the signal level from the controller 40 is "0", the NCU 2 connects the line 2a to the facsimile apparatus (i.e., a portion to the right of the NCU 2 in FIG. 1). In a normal state, the line 2a is connected to the telephone set 4. This connection control is performed by a CML relay incorporated in the NCU 2.

A hybrid circuit 6 separates a transmitting system signal from a receiving system signal and transmits a "transmit" signal from an adder 16 to the line 2a through the NCU 2, and sends a receive signal to a demodulator 20 and a V21 demodulator 18 through the NCU 2.

A reader 8 sequentially reads one-line signals from a transmit original-in the main scanning direction to generate a binary signal train consisting of black and white values. The reader 8 is constituted by an optical system and an image pickup element such as a CCD line sensor.

An encoder 10 encodes read data in accordance with a coding scheme (e.g., an MH, MR or MMR scheme).

A modulator 12 modulates an image signal on the basis of the known CCITT recommendations V27ter (differential phase modulation) or V29 (quadrature modulation). When a signal level from the controller 40 is set to be "0", the modulator 12 receives a signal from the encoder 10. However, when the signal level from the controller 40 is set to be "1", the modulator 12 receives a signal from an image memory 22.

A modulator 14 is a modulator for performing modulation on the basis of the known CCITT recommendations V21 and modulates a procedure signal from the controller 40.

The adder 16 adds outputs from the modulators 12 and 14.

The demodulator 18 performs demodulation of a procedure signal on the basis of the known CCITT recommendations V21. The demodulator 20 performs demodulation on the basis of the known CCITT recommendations V27ter or V29.

The image memory 22 stores receive data when relay multi-address communication is to be performed. The image memory 22 comprises, e.g., a RAM. When a level of a memory control signal from the controller 40 is set to be "0", the image memory 22 is kept disabled. However, when the level of the memory control signal goes to "1", the image memory 22 stores demodulated data from the demodulator 20 in a memory space on the basis of an address signal from the controller 40.

When a level of the memory control signal is "2", the image memory 22 supplies data stored in the corresponding memory space to a decoder 24 or the V27ter or V29 modulator 12 on the basis of an address signal from the controller 40.

The decoder 24 decodes demodulated data from the demodulator 20 or the image memory 22 on the basis of a decoding scheme (e.g., an MH, MR or MMR decoding scheme). When a signal having level "0" is output from the controller 40, the decoder 24 receives a signal from the demodulator 20. However, when the signal has level "1", the decoder 24 receives a signal from the image memory 22.

A recorder 26 sequentially records black/white signals from the decoder 24 in units of lines.

A relay multi-address communication select key 28 is depressed by an operator when relay multi-address communication is forcibly performed at the receiving side. Upon depression of the relay multi-address communication select key 28, a pulse signal is output.

A relay multi-address communication display circuit 30 displays the relay multi-address communication mode and is set in an OFF state at the time of initialization. The relay multi-address communication display circuit 30 repeats ON/OFF operations on the basis of the pulse signal from the relay multi-address communication select key 28. When the relay multi-address communication display circuit 10 30 is set in the ON state, it outputs a signal of level "1" to the controller 40. Otherwise, it outputs a signal of level "0" to the controller 40. The display circuit 30 turns off a display unit in response to an ON pulse from the controller 40. In this case, the display circuit 30 sends a signal of level "0" to the controller 40.

Memories 32 and 34 store time $\underline{a}$ and time $\underline{b}$, respectively. The time $\underline{a}$ memory 32 and the time $\underline{b}$ memory 34 perform relay multi-address communication within a time interval between time $\underline{a}$ and time $\underline{b}$ under control (to be described later). The controller 40 outputs write pulses to the memories 32 and 34, so that 4-digit time $\underline{a}$ and 4-digit time $\underline{b}$ are input to the memories 32 and 34, respectively. In addition, the controller 40 outputs read pulses to the memories 32 and 34 to read out time $\underline{a}$ and time $\underline{b}$.

A dial number memory 36 includes a RAM and stores relay multi-address destination dial number data (one or more) as in a known relay multi-address apparatus and is used to store image source dial number data (one or more) in a control operation (to be described later).

Storage of dial number data of a multi-address destination station is performed by known procedures. Each source station dial number for relay multi-address communication may be entirely stored. In this embodiment, however, only the lower four digits are stored, and 100 dial numbers corresponding to "00" to "99" can be stored. The controller 40 outputs a write pulse to the dial number memory 36 to write a desired dial number. The controller 40 outputs information representing the order of a desired dial number and a read pulse to the dial number memory 36, thereby reading out the desired dial number.

A console unit 38 comprises a known LCD panel, a ten-key pad, and various function keys. Ten-key information, "*" key information, "#" key information, and function key information upon depression of the corresponding keys are output from the console unit 38 to the controller 40.

The controller 40 comprises a microprocessor and controls the entire facsimile apparatus in accordance with a program stored in a ROM 40r. A timer 40t is connected to the controller 40 and is arranged to output current time information to the controller 40.

An operation of the facsimile apparatus having the above arrangement will be described below.

The facsimile apparatus shown in FIG. 1 forcibly performs relay multi-address communication when this apparatus serves as an image receiving apparatus. The following three relay multi-address communication methods are available in the present invention:

(1) a method in which one subsequent receive operation is performed by relay multi-address communication (to be referred to as a first method thereinafter);

(2) A method in which receive image is forcibly subjected to relay multi-address communication when a time zone is designated and current time measured by the timer 40t falls within the designated time zone (to be referred to as a second method hereinafter); and (3) a method in which relay multi-address communication is performed only when identification information of a transmitting station which performs relay multi-address communication coincides with input information. For example, when dial information is used as identification information, a TSI (Transmission Station Identification) signal sent from the transmitting station is checked. When all digits of the dial number (e.g., lower four digits of the dial number) coincide with data prestored in the dial number memory 36, relay multi-address communication is forcibly performed (to be referred to as a third method hereinafter).

By employing one of the above methods, relay multi-address communication can be performed without using a nonstandard signal. Even when data is received from a facsimile apparatus whose manufacturer is different from that of the receiving facsimile apparatus, the receiving facsimile apparatus can perform relay multi-address communication.

Figure 2A:
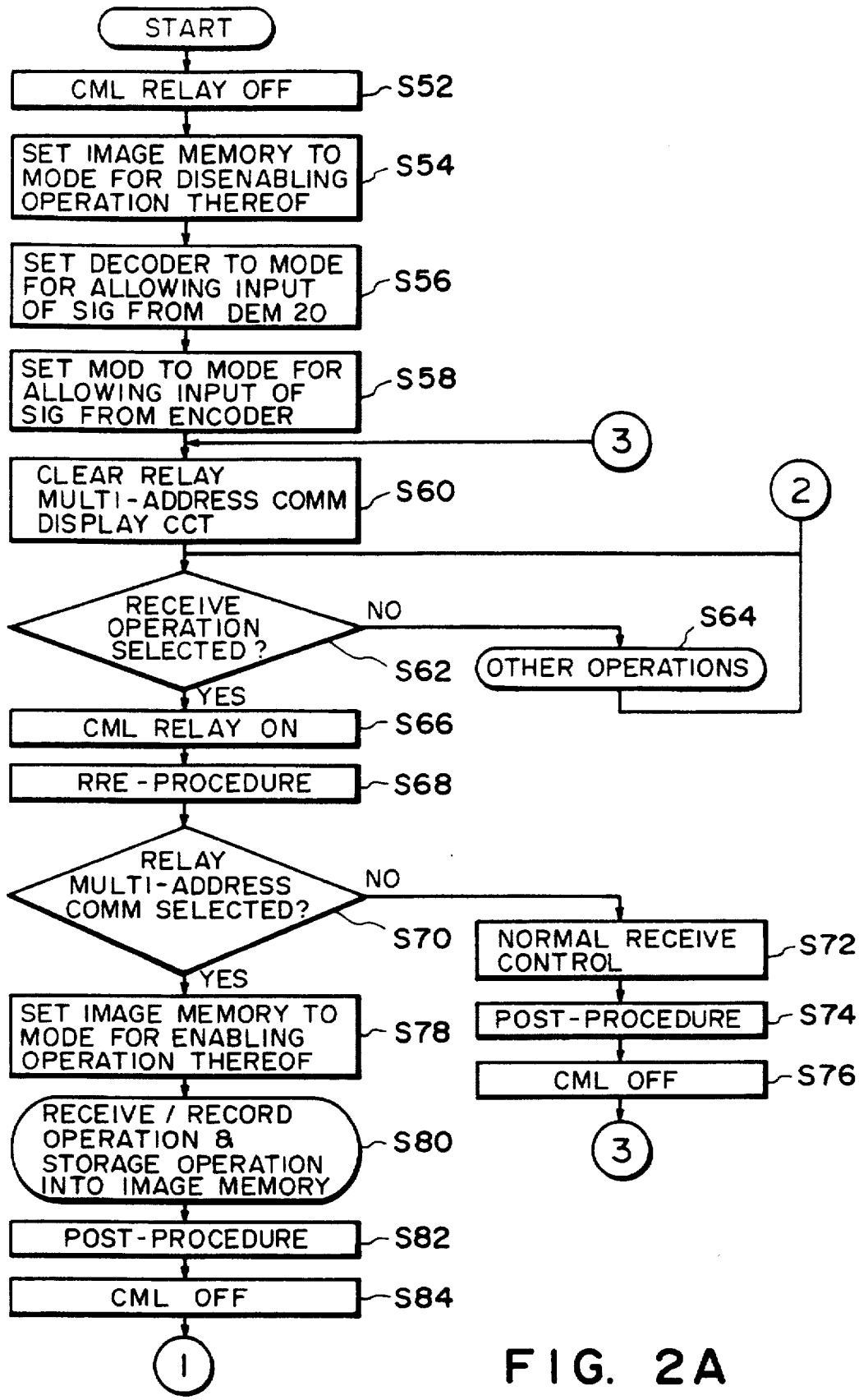
FIGS. 2 and B are flow charts showing relay multi-address communication control of the facsimile apparatus according to the first method of the present invention.
Figure 2B:
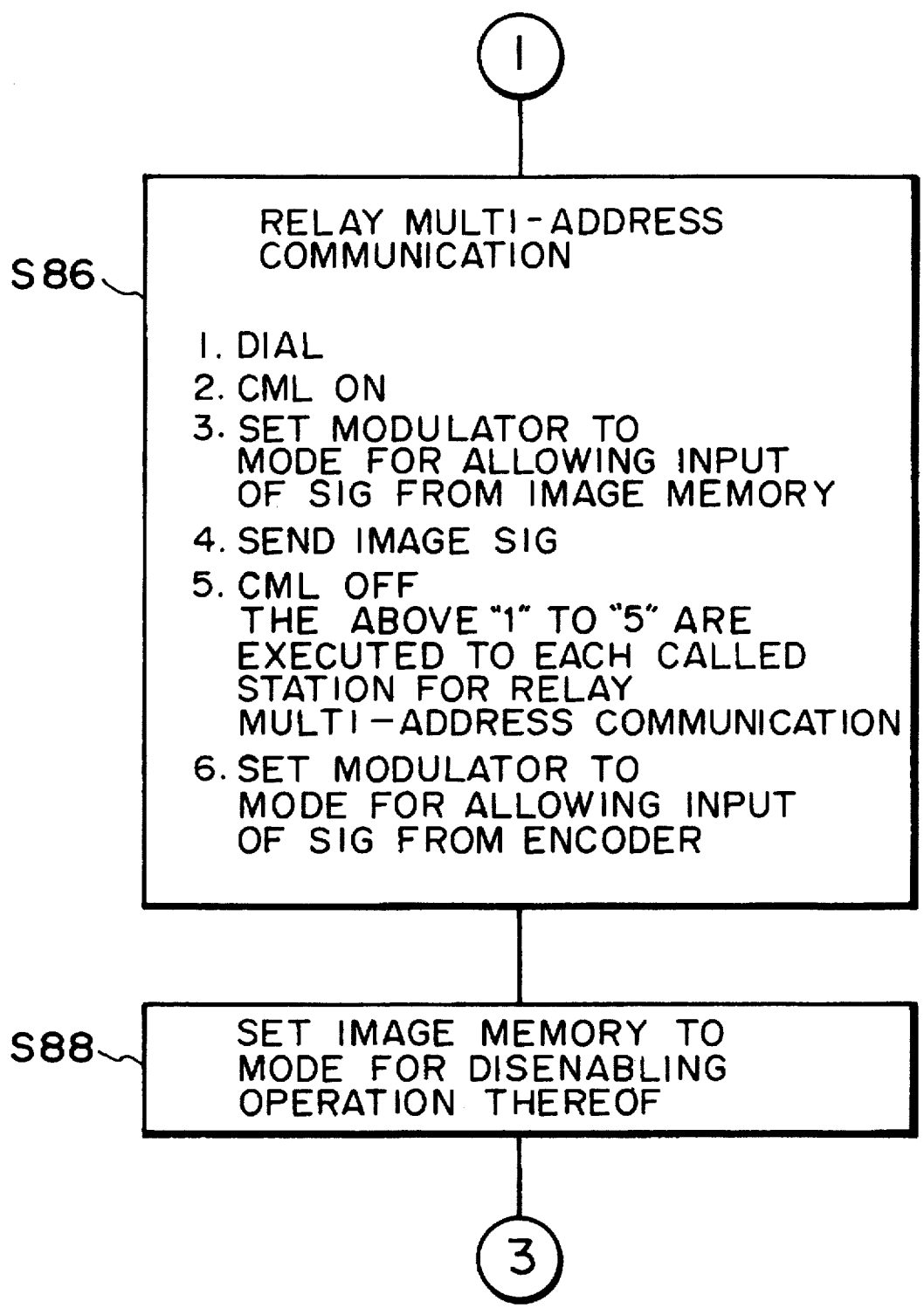

A relay multi-address communication operation of the arrangement described above will be described with reference to FIGS. 2A and 2B. FIGS. 2A and 2B are flow charts showing communication procedures of relay multi-address communication (relay multi-address communication is forcibly performed for only one communication operation) on the basis of the first method. The illustrated procedures are stored as a control program for the controller 40 in the ROM 40r in FIG. 1. The flow chart in FIG. 2A is connected to that in FIG. 2B through the same nodes.

Initialization is performed in steps S52 to S60 in FIG. 2A.

In step S52, a CML relay in the NCU 2 is turned off. After the line 2a is connected to the telephone set 4, a mode for disabling the image memory 22 is set in step S54.

In step S56, the decoder 24 is set in a mode for allowing input of demodulated data from the demodulator 20. In step S58, the modulator 12 is set in a mode for allowing input of a signal from the encoder 10. In step S60, the display circuit 30 is cleared.

When a receive operation is selected in step S62, the CML relay of the NCU 2 is turned on to connect the line 2a to the hybrid circuit 6 in step S66. A pre-procedure is performed in step S68. The receive operation selection in step S62 is performed by detection of a call signal or manual operation at the console unit 38.

When the controller 40 determines from a state of the display circuit 30 in step S70 that relay multi-address communication is selected, the mode for enabling the image memory 22 is set in step S78. In step S80, this information is stored in the image memory 22 while a receive/record operation is being performed. A post-procedure is performed in step S82. In step S84, the CML relay of the NCU 2 is turned off to connect the line 2a to the telephone set 4.

In step S86 of FIG. 2B, relay multi-address communication is performed. More specifically, a destination for relay multi-address communication is called, and the CML relay in the NCU 2 is turned on.

The modulator 12 is set in a mode for receiving a signal from the image memory 22, the image signal is transmitted, and then the CML relay is turned off. These operations are performed for all destinations or called stations subjected to relay multi-address communication. Thereafter, the modulator 12 is set in a mode for receiving a signal from the encoder 10. In step S88, a mode for disabling the image memory 22 is set, and the flow returns to step S60.

Whether relay multi-address communication is selected is determined by only the timing at which first image information is received. Even if the relay multi-address communication select key 28 is depressed upon the start of reception of the first image information, the receive state is not changed. When one communication cycle is completed, the mode for disabling relay multi-address communication is always set in step S60. The relay multi-address communication is performed only for one every receive operation upon setting of the corresponding mode.

When relay multi-address communication is not selected in step S70, normal reception is performed in step S72. The post-procedure is performed in step S74. In step S76, the CML relay is turned off, and the flow returns to step S60.

When any other operation is selected, this operation is performed in step S64. That is, various operations are performed as in the known facsimile apparatus.

In this manner, image information to be received by one communication cycle can be forcibly subjected to relay multi-address communication.

Since relay multi-address communication is forcibly performed at the receiving end, the non-standard apparatus signal need not be used, and relay multi-address communication can be performed between apparatuses manufactured by different manufacturers. When a facsimile apparatus (or a plurality of remote a apparatuses) at a remote position (positions) different from a normal working location is (are) designated as a destination (destinations) of multi-address communication inadvance, information received at the normal working location is accessible at such a designated apparatus (apparatuses).

Figure 3:
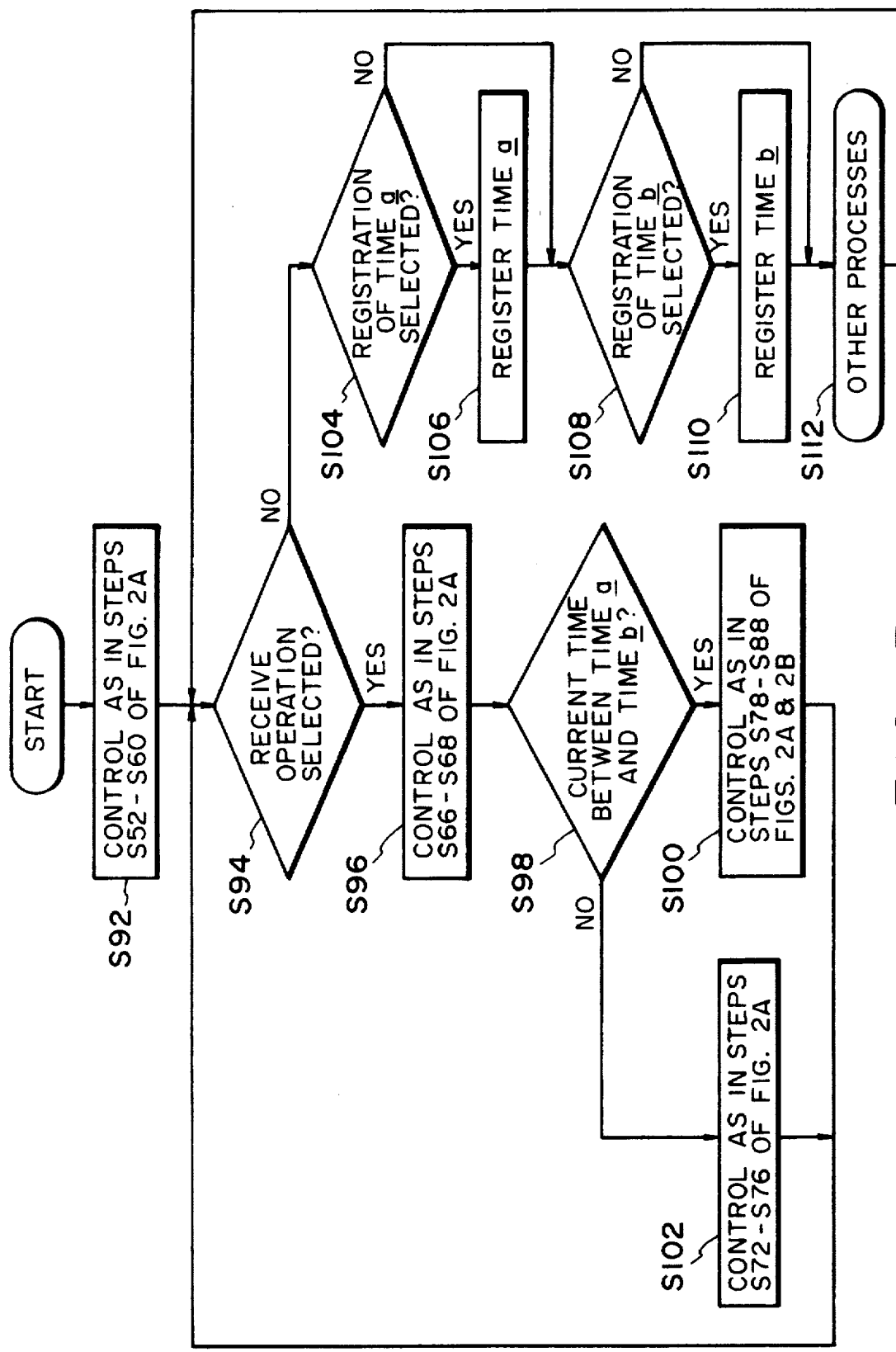

FIG. 3 shows a control sequence for performing a relay multi-address communication operation based on the second method. In this embodiment, a predetermined time zone (time a to time b) is designated, and forcible relay multi-address communication shown in FIG. 2 is performed within this time zone. The processing in FIGS. 2A and 2B is represented by one step in FIG. 3.

Step S92 represents the same initialization control as in steps S52 to S58 in FIG. 2A. However, step S60 is not executed because relay multi-address communication may be repeatedly performed.

When a receive operation is selected in step S94, communication control (up to the pre-procedure) in steps S66 to S68 in FIG. 2A is performed in step S96.

When the controller 40 determines in step S98 that the current time falls within the time zone between time a and time b, respectively set in the memories 32 and 34, relay multi-address communication control in steps S78 to S88 of FIG. 2A is performed in step S100. The current time is counted by the timer 40t.

When the controller 40 determines in step S98 that the current time counted by the timer 40t falls outside the range between time a and time b, normal receive control in steps S72 to S76 of FIG. 2A is performed in step S102.

When a mode for registering time a is selected in step S104, time a is set in the time a memory 32 in accordance with operation information from the console unit 38 in step S106. Similarly, when a mode for registering time b is selected in step S108, time b is registered in the time b memory 34 in step S110. An operation scheme for setting time zone information can be a known procedure.

Various other processes in a known facsimile apparatus are performed in step S112.

According to the above operations, forcible relay multi-address communication as in FIG. 2 can be performed only within the predetermined time zone. Once the time zone is set, receive information is subjected to multi-address communication within the set time zone. Cumbersome setting operations need not be repeated.

FIG. 4 shows a relay multi-address communication operation based on the third method. In this case, a dial number of a transmitting station is collated with an input dial number. If a coincidence is established, relay multi-address communication is performed. FIG. 4 is illustrated in the same format as in FIG. 3.

The operations in steps S122 to S126 are the same as those in steps S92 to S96, so that initialization, receive selection, and a pre-procedure are performed.

The controller 40 determines in step S128 whether a TSI signal is sent from a calling station. The procedure signals are received using the demodulator 18.

If YES in step S128, the controller 40 determines in step S130 whether the four lower digits of the dial number sent by the TSI (Transmission Station Identification) signal coincide with the lower four digits of the dial number of the transmitting station subjected to relay multi-address communication and stored in the dial number memory 36. If YES in step S130, relay multi-address communication is performed in step S132. Otherwise, normal receive operation is performed in step S134.

It is determined in step S136 whether the dial number of the transmitting station subjected to relay multi-address communication is registered or erased in accordance with an operation at the console unit 38. If YES in step S136, the dial number input from the console unit 38 is registered in the dial number memory 36, or the dial number already stored in the dial number memory 36 is erased (or edited). A known procedure is used as an operation scheme for registering the dial number. Each dial number is stored in association with a corresponding one of identification numbers "00" to "99" so as to facilitate editing or erasure.

Other processes in a known facsimile apparatus are performed in step S140.

Under the control shown in FIG. 4, only information received from a predetermined transmitting station is forcibly subjected to relay multi-address communication. Only images from important customers are transferred to another apparatus, and the relay of unnecessary information such as a direct mail (fax) can be prevented.

The first to third methods have been described as independent control procedures. However, a facsimile apparatus having one of the above methods may be arranged, or a plurality of methods may be used in one facsimile apparatus. Alternatively, the methods can be combined under the AND or OR logical condition, and the selected methods can be used. For example, a condition for performing forcible relay multi-address communication for relaying an image from a given transmitting station within a given time zone can be set.

Any other information than a dial number can be used as transmitting station identification information subjected to forcible relay multi-address communication at the receiving side. This information may be abbreviated transmitting station information set by a TSI signal or the like.

Selection of relay multi-address communication with the relay multi-address communication selection key is cleared during every communication cycle. However, this selection may be set to be effective until the set conditions are changed by the operator. In addition, the selection conditions need not be limited to each communication cycle, but can be set every page information.

According to the second method, the time for setting relay multi-address communication mode and the time for releasing the relay multi-address communication mode are provided. However, this mode may be registered at a plurality of times. According to the third method, identification information of a plurality of transmitting stations may be designated.

The present invention is not limited to the particular embodiment described above. Various changes and modifications may be made within the spirit and scope of the invention.

What is claimed is:

1. A data communication apparatus comprising:

receiving means for receiving data from a transmitter station via a first communication line;

transmitting means for transmitting data to destination station via a second communication line;

a clock;

controlling means connected to said clock for controlling said transmitting means to transmit the data received by said receiving means, wherein said controlling means detects a receiving time at which said receiving means receives data in accordance with an output of said clock, and determines whether or not to cause said transmitting means to transmit the data received by said receiving means in dependence on the receiving time; and time zone setting means for setting a time zone having a start time and an end time,
wherein when the receiving time is after the start time and before the end time so as to be within the time zone set by said time zone setting means, said control means causes said transmitting means to transmit the received data, and
when the receiving time is not within the time zone, said control means does not cause said transmitting means to transmit the received data in dependence on the receiving time.

2. An apparatus according to claim 1, wherein said data is image data.

3. A data communication apparatus according to claim 1, further comprising recording means for recording data, wherein when the receiving time is not within the time zone set by said time zone setting means, said recording means records the received data.

4. An apparatus according to claim 1, wherein said control means causes said transmitting means to transmit the received data to a plurality of destination stations.

5. An apparatus according to claim 4, further comprising memory means for storing the received data, wherein said transmitting means transmits the data stored in said memory means.

6. An apparatus according to claim 1, further comprising destination designating means for designating in advance at least one destination to which data is to be sent in response to an instruction of an operator, wherein said transmitting means transmits data to each destination designated by said designating means.

7. A data communication apparatus comprising:

receiving means for receiving data from a transmitter station via a first communication line;

transmitting means for transmitting data received by said receiving means to a destination station via a second communication line;

detecting means for detecting a station which transmitted the data received by said receiving means;

setting means, responsive to a manual instruction of an operator, for setting a predetermined station; and control means for comparing the detected transmitter station with the predetermined station and for controlling said transmitting means to transmit the received data to the destination station when a comparison result of the control means indicates that the detected transmitter station corresponds to the predetermined station.

8. An apparatus according to claim 7, wherein said transmitting means transmits the received data without interruption after entry of the instruction by the operator.

9. An apparatus according to claim 7, wherein said data is image data.

10. An apparatus according to claim 7, wherein said transmitting means transmits the received data to a plurality of destination stations.

11. An apparatus according to claim 10, further comprising memory means for storing the received data, wherein said transmitting means transmits the data stored in said memory means.

12. An apparatus according to claim 7, further comprising destination designating means for designating in advance at least one destination to which data is to be sent, in response to an instruction of an operator, wherein said transmitting means transmits data to each destination designated by said designating means.

13. A data communication method comprising the steps of:

receiving data from a transmitter station via a first communication line;

transmitting data to a destination station via a second communication line;

controlling said transmitting step to transmit the data received by said receiving step, wherein said controlling step detects a receiving time at which said receiving step receives data in accordance with an output of a clock, and determines whether or not to cause said transmitting step to transmit the data received by said receiving step in dependence on the receiving time; and setting a time zone having a start time and an end time, wherein when the receiving time is after the start time and before the end time so as to be within the time zone set by said time zone setting step, said control step causes said transmitting step to transmit the received data, and when the receiving time is not within the time zone, said control step does not cause said transmitting step to transmit the received data in dependence on the receiving time.

14. A method according to claim 13, wherein said data is image data.

15. A method according to claim 13, further comprising a step of recording data, wherein when the receiving time is not within the time zone set by said time zone setting step, said recording step records the received data.

16. A method according to claim 13, wherein said control step causes said transmitting step to transmit the received data to a plurality of destination stations.

17. A method according to claim 16, further comprising a step of storing the received data, wherein said transmitting step transmits the data stored in said storing step.

18. A method according to claim 13, further comprising designating in advance at least one destination to which data is to be sent in response to an instruction of an operator, wherein said transmitting step transmits data to each destination designated by said designating step.

19. A data communication method comprising the steps of:

receiving data from a transmitter station via a first communication line;

transmitting data received by said receiving step to a destination station via a second communication line;

detecting a station which transmitted the data received by said receiving step;

responsive to a manual instruction of an operator, setting a predetermined station;

comparing the detected station with the predetermined station; and controlling said transmitting step to transmit the received data when a comparison result of the control step indicates that the detected transmitter station corresponds to the predetermined station.

20. A method according to claim 19, wherein said transmitting step transmits the received data without interruption after entry of the instruction by the operator.

21. A method according to claim 19, wherein said data is image data.

22. A method according to claim 19, wherein said transmitting step transmits the received data to a plurality of destination stations.

23. A method according to claim 22, further comprising storing the received data, wherein said transmitting step transmits the data stored in said storing step.

24. A method according to claim 19, further comprising designating in advance at least one destination to which data is to be sent, in response to an instruction of an operator, wherein said transmitting step transmits data to each destination designated by said designating step.

* * * * *

UNITED STATES PATENT AND TRADEMARK OFFICE
CERTIFICATE OF CORRECTION

PATENT NO. : 5,594,867
DATED : January 14, 1997
INVENTOR(S) : TAKEHIRO YOSHIDA

It is certified that error appears in the above-identified patent and that said Letters Patent is hereby corrected as shown below:

COLUMN 1

Line 29, "Galled" should read --called--.

COLUMN 2

Line 34, "FIGS. 2 and B" should read --FIGS. 2A and 2B--.

COLUMN 3

Line 7, "original-in" should read --original in--; and
Line 66, "10 30" should read --30--.

COLUMN 4

Line 51, "A method" should read --a method--.

UNITED STATES PATENT AND TRADEMARK OFFICE
CERTIFICATE OF CORRECTION

PATENT NO. : 5,594,867

DATED : January 14, 1997

INVENTOR(S) : TAKEHIRO YOSHIDA

It is certified that error appears in the above-identified patent and that said Letters Patent is hereby corrected as shown below:

COLUMN 6

Line 8, "the" (second occurrence) should read --a--; and
Line 12, "a" (second occurrence) should be deleted.

Signed and Sealed this

Twenty-ninth Day of July, 1997

Attest:

BRUCE LEHMAN

Attesting Officer

Commissioner of Patents and Trademarks